Patented Oct. 31, 1933

1,932,832

UNITED STATES PATENT OFFICE 1,932,832

DECOLORIZING, PURIFYING, AND ADSORB-
ING AGENT, AND METHOD OF MAKING
THE SAME

John W. Turrentine, Washington, D. C.

No Drawing. Application February 18, 1925
Serial No. 10,150

1 Claim. (Cl. 252—2)

(Granted under the act of March 3, 1883, as
amended April 30, 1928; 370 O. G. 757)

This application is made under the act approved April 30, 1928, and the invention herein described, if patented, may be manufactured and used by or for the Government for governmental purposes without payment to me of any royalty thereon.

This invention relates to decolorizing, purifying and adsorbing agents and methods of making the same; and it comprises as a new composition of matter a decolorizing, purifying and adsorbing agent, consisting of granular silica or siliceous material having a very large and active surface, adsorption being a surface phenomenon, such granular silica or siliceous material having a rapid and high decolorizing and adsorbing power and having also the power of removing finely divided suspended solids and colloids from liquids; and it further comprises a method of making such material wherein a natural or other silicate or siliceous mineral or material or mixture of such is treated with an acid or other reagent to free the silica of the silicate from all or most of the other elements or compounds present and to remove them, either as useful or as waste materials: all as more fully hereinafter set forth and as claimed.

Several forms of silica or silicates are now employed as decolorizing and purifying agents, such as fuller's earth and kieselguhr, or infusorial or diatomaceous earth, as it is variously called, natural products, the latter made up of the siliceous skeletons of diatoms, used as found without or with slight purification or other processing; and silica gel, or hydrated silicon dioxide or silicic acid, an artificial product made by the hydrolysis or other decomposition of sodium or other artificial silicate; both radically different from the product and formed by processes in nowise similar to the process made the subject of this invention. Natural siliceous decolorizing agents are relatively low grade and inefficient as decolorizing and purifying agents, that is to say they possess only a slight power of removing coloring matter or of adsorption as compared with certain artificial or manufactured products, such as for example the activated vegetable decolorizing carbons. They are employed with only that power of decolorization or adsorption which they inherently and naturally possess. They are therefore limited in their field of application and as they are low-grade and inefficient they have to be applied in relatively large proportions. After being so applied they retain by capillary attraction or otherwise a considerable portion of the liquid to which applied, causing considerable losses or else subsequent processing to recover the material so held. Therefore their use is restricted largely to relatively low-grade and inexpensive liquids and solutions. Silica gel, while an active decolorizing agent for liquids, is restricted in its use to non-aqueous liquids because it absorbs water with great avidity and in absorbing water loses its power as a decolorizing agent.

The present invention relates to a form of silica having a very rapid combined clarifying, purifying, decolorizing and adsorbing action of great efficiency, and to a method of producing such form of silica in large quantities and commercially feasible conditions from various raw materials. For instance I may employ silicates such as kaolin, leucite, feldspar, sanidine, sericite and phlogopite; and mixed silicates such as clay, wyomingite, greensand, and shales. But the use of potash silicates; or mixed potash and aluminum silicates is preferable since when they are used, by-products of value are obtained, for example, alumina in demand as a raw material for the aluminum industry, and potash, in demand by the fertilizer industry, and the economic aspects of the process are enhanced. I prefer the use of silicates or siliceous raw materials which are more readily decomposed in the manner dealt with in this invention; which are decomposed by cheap reagents and which are decomposed without heat treatments, or at least without heat treatments requiring furnace or kiln temperatures and operations. I prefer to use siliceous raw materials which are easily ground to a pulverulent or granular condition or are already as found in a suitable condition for treatment by my process and require no further grinding, and which upon treatment by my process yield a siliceous product which requires no further grinding.

For the preparation of a decolorizing, purifying and adsorbing agent from silicates or silicious material I use any one of a variety of reagents but I prefer to use a reagent which will combine with, dissolve or otherwise remove the more basic elements or compounds present and leave the silica or siliceous components as a granular or pulverulent solid without combining therewith or doing anything more with respect thereto than developing a product with as large a surface as possible and removing all combined and adhering matter therefrom.

What I accomplish with these reagents may be illustrated by an analogous procedure, namely that procedure whereby purifying, decolorizing and adsorbing carbons are prepared from vegetable materials, such as kelp, to yield kelpchar, a decolorizing carbon manufactured from kelp, by a process essentially involving drying, destructive distillation, raising to a high temperature, leaching and drying, a process designed to produce a carbon skeleton of the kelp plant, to cleanse the surface of the carbon skeleton from tars and other distillation products and the mineral or inorganic salts and other compounds present therein. That process yields a carbon whose most conspicuous physical characteristic may be described as a very large surface area per unit of weight; and whose most conspicuous chemical characteristic may be described as the functioning of secondary or residual valencies of the carbon to combine in a loose form of chemical combination with the coloring matter, impurities, colloids, etc., present in the liquid which the carbon is designed to purify. In the destructive distillation of the vegetable material the elements in chemical combination with the carbon are broken loose to enter into other combinations and are driven off, leaving elementary carbon with its secondary or residual valencies more or less unsatisfied and free to seek combinations with other elements or compounds. Carbon being electronegative in character it combines with electropositive materials, and being elementary carbon, which is relatively only slightly reactive at ordinary temperatures, its combination with these materials is of a loose and unstable order; and the reactions whereby the combination takes place are reversible and are influenced and controlled by a series of factors and variables such as electropositive or electronegative characteristics, concentration, molecular weights, size and weight of aggregates, temperatures, nature of solvent, etc., etc. In order that these secondary or residual valencies of carbon may function, the carbon surfaces must be free from films or other accumulations and deposits of extraneous material which serve to separate its active surfaces from the materials with which it is designed to combine. This may be spoken of as activation.

In the preparation of a purifying, decolorizing and adsorbing agent from silicates or siliceous material which is the subject of my invention I proceed along lines somewhat analogous to those outlined for the manufacture of decolorizing carbons and with somewhat similar purposes. That is to say what is accomplished by heat in the manufacture of activated decolorizing carbons whereby other elements are removed from their combination with the carbon of vegetable matter to yield a carbon skeleton of enlarged surfaces and functioning residual valencies, in the manufacture of activated decolorizing silica I accomplish with chemical reagents with which I remove the other elements combined or associated with the silica of natural silicates to yield a siliceous skeleton of enlarged surfaces and functioning residual valencies. Heat is the agent in the one, and chemical reagents in the other instance.

Silica being more strongly electronegative than carbon it is able to adsorb materials that are less electropositive than carbon. Thus activated carbons can be rendered more active toward the less electropositive materials by intermixture or incorporation with some siliceous material such as fuller's earth, the silica adding to the electronegative properties of the carbon and the carbon contributing to surface area which the silica lacks. The decolorizing and purifying siliceous material which is the product of the process herein described possesses both the electronegative properties inherent in silica and the large surface area, thoroughly cleansed surfaces and functioning secondary valencies analogous to those possessed by activated decolorizing carbons.

The process employed by me for the production of this siliceous decolorizing agent is designed to, and it is claimed does, yield a product possessing electronegative properties, an enlarged surface area, cleansed surfaces and functioning secondary valencies. The process is designed to, and it is claimed, does accomplish by chemical means, that is to say by the use of chemical reagents, what is accomplished by the destructive distillation of vegetable matter and activation of the resulting carbon skeleton. In other words, the reagent removes from their combination or association with the silica, the elements and compounds combined or associated therewith leaving a siliceous skeleton or residue with an enlarged surface area, a cleansed surface and unsatisfied residual valencies, by virtue of which it becomes an active decolorizing, purifying and adsorbing agent, possessing these properties to a greater degree it is believed than any other siliceous product now obtainable on the market and available for commercial use.

My process may be illustrated by a description of the following, a typical procedure. I take greensand as a silicate or mixture of silicates and treat it with sulfuric acid. Greensand contains principally the metals silicon, iron, aluminum and potassium. The iron is present mostly in the ferrous state and is combined as a hydrous potassium-ferrous-silicate to form the mineral, glauconite, which is green in color and to which the greensand owes its color and name. This mineral is combined with or permeates or constitutes an ingredient of the complex silicate known as greensand. When treated with sulfuric acid greensand yields its more basic elements such as potassium, iron and aluminum to the sulfuric acid to form the corresponding sulfates, which by virtue of their solubility in water go into solution in the aqueous medium in which the reaction is brought about. This solution is subsequently processed for the separation and recovery of the values it contains, by any method which yields the desired results. Thus, in treating greensand with the sulfuric acid, if the proper conditions be maintained siliceous skeletons of the original greensand grains are obtained which possess the properties of an active decolorizing agent. This residue of siliceous skeleton or granules is then washed with water to remove adsorbed impurities and dried whereby a commercially effective adsorbent is evolved.

In this process I use sulfuric acid for reasons of economy, although other acids may be used. And I prefer to apply the acid directly to the greensand without preliminary treatment such as roasting, sintering or other processing although certain advantages are had from certain preliminary operations; but they are not essential to the production of the final siliceous product which is the object of the operation. While the treatment of greensand with sulfuric acid as outlined is reducing the process to the simplest of terms I do not mean to say that this is the only way in which that purpose may be accomplished. Any other procedure is acceptable which does not destroy or adversely affect the original siliceous skeleton and which leaves it in a state in which it possesses an enlarged surface area, functioning residual valencies and other properties which make it an active decolorizing, purifying and adsorbing agent. However, that method is always preferred, other things being equal which facilitates the production of by-products from the greensand. And in this connection it may be said that the choice of raw material will be influenced by the consideration that from silicates of potassium, iron and aluminum the by-products, potash, iron oxide, and alumina are obtainable which may more than cover the manufacturing costs of the siliceous decolorizing product.

In the manufacture of the form of silica made the subject of my invention by the process here described and likewise made the subject of my invention, it will be observed there is not involved any intermediate formation of artificial silicates nor of hydrated silicic acid. On the contrary silicates are decomposed; not formed. And the main action sought in my process is the removal, from the silica of the natural silicate, of the other elements and compounds combined or associated therewith and forming the said natural silicate. To accomplish this purpose acid or other reagent is used. And in applying this acid an excess is employed, that is, more than enough to combine with these elements and compounds whose removal is sought, which excess is designed to insure the complete removal of these elements and compounds so as to obtain with certainty completely and thoroughly cleansed surfaces; and the complete removal of these elements and compounds from the interstices, depressions, capillaries, crevices, and other intricacies of the original and resulting siliceous skeleton so as to insure the development of greatly enlarged surface areas.

The development of functioning valencies of the siliceous skeleton to which this form of silica owes in part its powers as a decolorizing agent manifests itself in the further property that in addition to its ability to absorb various forms of matter upon its surface in a loose form of chemical combination it is enabled likewise to react with other elements, ions or compounds to form more definite chemical combinations, as for example it is able to combine with the basic ion of sodium or potassium hydroxide in aqueous solution to form the corresponding silicate, soluble in water; that is to say, this activated silica is soluble in aqueous solutions of caustic soda or potash.

My new article of manufacture may be described as a quick and clear filtering, rapidly acting, purifying, clarifying and decolorizing form of silica having a relatively enormous adsorptive power owing to its enlarged surface areas, cleansed surfaces and functioning secondary valencies. Production of these characteristics and properties is induced by removing from the original silica of natural silicate or mixtures of silicate, the elements or compounds associated therewith in such a way as to leave the siliceous skeleton or residue of the original silicate.

My new form of silica is to be differentiated from the natural siliceous decolorizing agent as diatomaceous earth by the fact that it is a manufactured product, that it is superior in activity to the natural products and that it is different in physical structure and in chemical behavior; that it is not the product of the decomposition of an artificial silicate; that it is not the product of the dehydration of gelatinous silicic acid; that in the presence of water it does not become gelatinous silicic acid; that in the presence of water it maintains its original granular form without appreciable enlargement of the size of individual or aggregate grains; and that in the presence of water it does not lose its power of adsorption but on the contrary is an active and useful adsorbent in aqueous media.

I claim:

A commercial adsorbent silica resulting from the extraction of greensand with an excess of acid over the theoretical amount necessary to combine with the non-silicious constituents to substantially completely dissolve metallic oxides, then substantially completely removing the adsorbed impurities of the residual silica by washing, and drying.

JOHN W. TURRENTINE.